(12) United States Patent
Furht et al.

(10) Patent No.: US 11,265,566 B2
(45) Date of Patent: Mar. 1, 2022

(54) SIGNALING OF GLOBAL MOTION RELATIVE TO AVAILABLE REFERENCE FRAMES

(71) Applicant: OP Solutions, LLC, Newton, MA (US)

(72) Inventors: Borivoje Furht, Boca Raton, FL (US); Hari Kalva, Boca Raton, FL (US); Velibor Adzic, Boca Raton, FL (US)

(73) Assignee: OP SOLUTIONS, LLC, Amherst, MA (US)

( * ) Notice: Subject to any disclaimer, the term of this patent is extended or adjusted under 35 U.S.C. 154(b) by 0 days.

(21) Appl. No.: 17/006,568

(22) Filed: Aug. 28, 2020

(65) Prior Publication Data

US 2020/0396472 A1    Dec. 17, 2020

Related U.S. Application Data

(63) Continuation of application No. PCT/US2020/029942, filed on Apr. 24, 2020.
(Continued)

(51) Int. Cl.
| | |
|---|---|
| *H04N 19/00* | (2014.01) |
| *H04N 19/44* | (2014.01) |
| *H04N 19/105* | (2014.01) |
| *H04N 19/117* | (2014.01) |
| *H04N 19/13* | (2014.01) |
| *H04N 19/159* | (2014.01) |
| *H04N 19/176* | (2014.01) |
| *H04N 19/184* | (2014.01) |
| *H04N 19/46* | (2014.01) |

(Continued)

(52) U.S. Cl.
CPC ........... *H04N 19/44* (2014.11); *H04L 65/601* (2013.01); *H04N 19/105* (2014.11); *H04N 19/117* (2014.11); *H04N 19/13* (2014.11); *H04N 19/159* (2014.11); *H04N 19/176* (2014.11); *H04N 19/184* (2014.11); *H04N 19/46* (2014.11); *H04N 19/513* (2014.11)

(58) Field of Classification Search
CPC .... H04N 19/44; H04N 19/105; H04N 19/117; H04N 19/13; H04N 19/159; H04N 19/176; H04N 19/184; H04N 19/46; H04N 19/513; H04L 65/601
See application file for complete search history.

(56) References Cited

U.S. PATENT DOCUMENTS

| | | | |
|---|---|---|---|
| 2011/0103480 A1* | 5/2011 | Dane | H04N 19/527 375/240.16 |
| 2017/0332095 A1* | 11/2017 | Zou | H04N 19/52 |

(Continued)

OTHER PUBLICATIONS

PCT/US2020/029942, International Search Report, dated Jul. 21, 2020.

*Primary Examiner* — Zhihan Zhou
(74) *Attorney, Agent, or Firm* — Caldwell Intellectual Property Law, LLC

(57) ABSTRACT

A decoder includes circuitry configured to receive a bitstream, extract a header including a list of reference frames available for global motion compensation, determine, using the header, a global motion model for a current block, the global motion relative to a reference frame contained in the list of reference frames, and decode the current block using the global motion model. Related apparatus, systems, techniques and articles are also described.

20 Claims, 6 Drawing Sheets

Related U.S. Application Data

(60) Provisional application No. 62/838,517, filed on Apr. 25, 2019.

(51) Int. Cl.
*H04N 19/513* (2014.01)
*H04L 65/60* (2022.01)

(56) References Cited

U.S. PATENT DOCUMENTS

| | | | |
|---|---|---|---|
| 2018/0098063 A1* | 4/2018 | Chen | H04N 19/139 |
| 2018/0249177 A1* | 8/2018 | Lin | H04N 19/593 |
| 2018/0359483 A1* | 12/2018 | Chen | H04N 19/44 |
| 2019/0149841 A1* | 5/2019 | Mukherjee | H04N 19/573 |
| | | | 375/240.16 |
| 2019/0158870 A1* | 5/2019 | Xu | H04N 19/51 |
| 2020/0099949 A1* | 3/2020 | Xu | H04N 19/70 |
| 2020/0186795 A1* | 6/2020 | Wang | H04N 19/132 |
| 2020/0260111 A1* | 8/2020 | Liu | H04N 19/46 |

* cited by examiner

SIGNALING OF GLOBAL MOTION RELATIVE TO AVAILABLE REFERENCE FRAMES

CROSS-REFERENCE TO RELATED APPLICATIONS

This application claims the benefit of priority of International Application No. PCT/US20/29942, filed on Apr. 24, 2020 and entitled "SIGNALING OF GLOBAL MOTION VECTOR IN PICTURE HEADER," which claims the benefit of priority of U.S. Provisional Patent Application Ser. No. 62/838,517, filed on Apr. 25, 2019, and titled "SIGNALING OF GLOBAL MOTION RELATIVE TO AVAILABLE REFERENCE FRAMES." Each of International Application No. PCT/US20/29942 and U.S. Provisional Patent Application Ser. No. 62/838,517 is incorporated by reference herein in its entirety.

FIELD OF THE INVENTION

The present invention generally relates to the field of video compression. In particular, the present invention is directed to signaling of global motion vector relative to available reference frames.

BACKGROUND

A video codec can include an electronic circuit or software that compresses or decompresses digital video. It can convert uncompressed video to a compressed format or vice versa. In the context of video compression, a device that compresses video (and/or performs some function thereof) can typically be called an encoder, and a device that decompresses video (and/or performs some function thereof) can be called a decoder.

A format of the compressed data can conform to a standard video compression specification. The compression can be lossy in that the compressed video lacks some information present in the original video. A consequence of this can include that decompressed video can have lower quality than the original uncompressed video because there is insufficient information to accurately reconstruct the original video.

There can be complex relationships between the video quality, the amount of data used to represent the video (e.g., determined by the bit rate), the complexity of the encoding and decoding algorithms, sensitivity to data losses and errors, ease of editing, random access, end-to-end delay (e.g., latency), and the like.

Motion compensation can include an approach to predict a video frame or a portion thereof given a reference frame, such as previous and/or future frames, by accounting for motion of the camera and/or objects in the video. It can be employed in the encoding and decoding of video data for video compression, for example in the encoding and decoding using the Motion Picture Experts Group (MPEG)-2 (also referred to as advanced video coding (AVC) and H.264) standard. Motion compensation can describe a picture in terms of the transformation of a reference picture to the current picture. The reference picture can be previous in time when compared to the current picture, from the future when compared to the current picture. When images can be accurately synthesized from previously transmitted and/or stored images, compression efficiency can be improved.

SUMMARY OF THE DISCLOSURE

In an aspect, a decoder includes circuitry configured to receive a bitstream, extract a header including a list of reference frames available for global motion compensation, determine, using the header, a global motion model for a current block, the global motion relative to a reference frame contained in the list of reference frames, and decode the current block using the global motion model.

In another aspect, a method includes receiving, by a decoder, a bitstream. The method includes extracting a header including a list of reference frames available for global motion compensation. The method includes determining, using the header, a global motion model for a current block, the global motion relative to a reference frame contained in the list of reference frames. The method includes decoding the current block using the global motion model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

"Global motion" in video refers to motion and/or a motion model common to all pixels of a region, where a region may be a picture, a frame, or any portion of a picture or frame such as a block, CTU, or other subset of contiguous pixels. Global motion may be caused by camera motion, for example, camera panning and zooming may create motion in a frame that may typically affect the entire frame. Motion present in portions of a video may be referred to as local motion. Local motion may be caused by moving objects in a scene, such as without limitation an object moving from left to right in the scene. Videos may contain a combination of local and global motion. Some implementations of the current subject matter may provide for efficient approaches to communicate global motion to a decoder and use of global motion vectors in improving compression efficiency.

Figure 1:
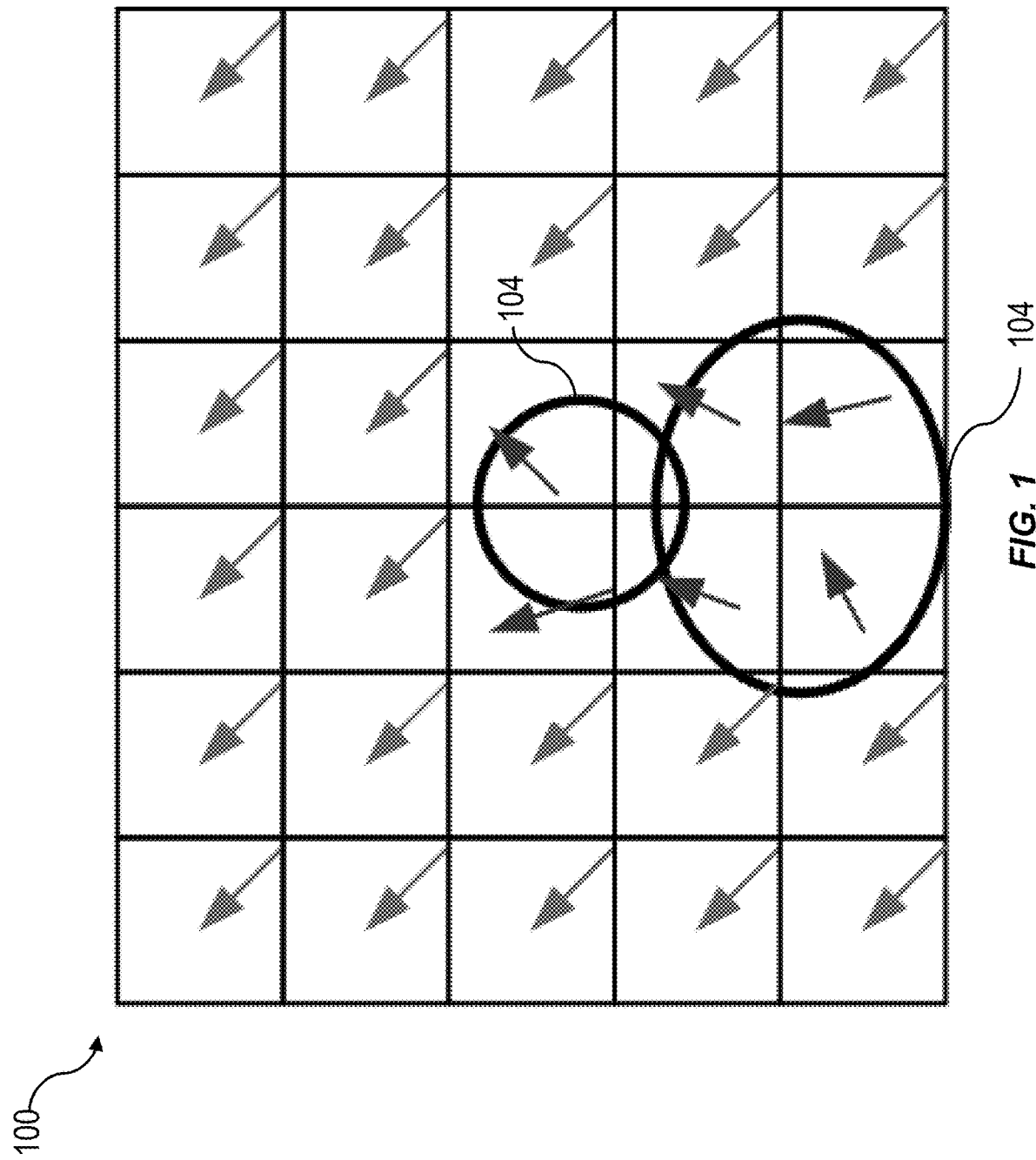
FIG. 1 is a diagram illustrating motion vectors of an example frame with global and local motion.

FIG. 1 is a diagram illustrating motion vectors of an example frame 100 with global and local motion. A frame 100 may include a number of blocks of pixels illustrated as squares, and their associated motion vectors illustrated as arrows. Squares (e.g., blocks of pixels) with arrows pointing up and to the left indicate blocks with motion that may be considered to be global motion and squares with arrows pointing in other directions (indicated by 104) indicate blocks with local motion. In the illustrated example of FIG. 1, many of the blocks have same global motion. Signaling the global motion in a header, such as a picture parameter set (PPS) or sequence parameter set (SPS), and using the signaled global motion may reduce motion vector information needed by blocks and may result in improved prediction. Although for illustrative purposes examples described below refer to determination and/or application of global or local motion vectors at a block level, global motion vectors may be determined and/or applied for any region of a frame and/or picture, including regions made up of multiple blocks, regions bounded by any geometric form such as without limitation regions defined by geometric and/or exponential coding in which one or more lines and/or curves bounding the shape may be angled and/or curved, and/or an entirety of a frame and/or picture. Although signaling is described herein as being performed at a frame level and/or in a header and/or parameter set of a frame, signaling may alternatively or additionally be performed at a sub-picture level, where a sub-picture may include any region of a frame and/or picture as described above.

As an example, and still referring to FIG. 1, simple translational motion may be described using a motion vector (MV) with two components MVx, MVy that describes displacement of blocks and/or pixels in a current frame. More complex motion such as rotation, zooming, and warping may be described using affine motion vectors, where an "affine motion vector," as used in this disclosure, is a vector describing a uniform displacement of a set of pixels or points represented in a video picture and/or picture, such as a set of pixels illustrating an object moving across a view in a video without changing apparent shape during motion. Some approaches to video encoding and/or decoding may use 4-parameter or 6-parameter affine models for motion compensation in inter picture coding.

For example, a six parameter affine motion may be described as:

$$x'=ax+by+c$$

$$y'=dx+ey+f$$

And a four parameter affine motion may be described as:

$$x'=ax+by+c$$

$$y'=-bx+ay+f$$

where (x,y) and (x',y') are pixel locations in current and reference pictures, respectively; a, b, c, d, e, and f are the parameters of the affine motion model.

Still referring to FIG. 1, parameters used describe affine motion may be signaled to a decoder to apply affine motion compensation at the decoder. In some approaches, motion parameters may be signaled explicitly or by signaling translational control point motion vectors (CPMVs) and then deriving affine motion parameters from the translational motion vectors. Two control point motion vectors (CPMVs) may be utilized to derive affine motion parameters for a four-parameter affine motion model and three control point translational motion vectors (CPMVs) may be utilized to obtain parameters for a six-parameter motion model. Signaling affine motion parameters using control point motion vectors may allow use of efficient motion vector coding methods to signal affine motion parameters.

With continued reference to FIG. 1, some modern video compression techniques may use multiple reference frames in inter prediction. When multiple reference frames are present, global motion relative to available reference frames may be signaled to more effectively apply motion compensation and improve compression efficiency. A list of frames available for reference may be maintained in a frame list List0. Frames in list may be indexed by their order relative to a current frame. All frames available for use as reference in coding a current picture may be indexed in List0. Global motion parameters may be specified for all available reference frames. Presence or absence of global motion relative to a frame in reference list may also be signaled; his may allow for efficient signaling of global motion information.

For example, and still referring to FIG. 1, table 1 shows a new PPS with global motion parameters for one or more frames in reference picture list. In the example of table 1, up to 16 reference pictures may be signaled. Presence of global motion for each available reference frame may be signaled. For all frames with global motion present, global motion parameters may be encoded as shown in table 1. If no predicted blocks in a current picture use global motion from a previously coded frame that is available for reference, corresponding global motion parameters may not be coded. On an encoder side this may incur frame delay if the PPS has to be updated after encoding current picture. Alternatively, efficient methods of encoding may be able to predict which available reference frames are not suitable for global motion compensation and remove such frames from PPS.

TABLE 1

| | Descriptor |
|---|---|
| pic_parameter_set_rbsp( ) { | |
|    pps_pic_parameter_set_id | ue(v) |
|    pps_seq_parameter_set_id | ue(v) |
|    . | |
|    . | |
|    . | |
|    ref_pic_count | u(4) |
|    for(i=1; i <= ref_pic_count; i++){ | |
|       gmc_present[i] | u(1) |
|    } | |
|    for(i=1; i <= ref_pic_count; i++){ | |
|       if(gmc_present[i]) | |
|          pps_global_motion_parameters ( ) | |
|    } | |
|    rbsp_trailing_bits( ) | |
| } | |

In an embodiment, and still referring to FIG. 1, an sps_affine_enabled_flag in a PPS and/or SPS may specify whether affine model based motion compensation may be used for inter prediction. If sps_affine_enabled_flag is equal to 0, the syntax may be constrained such that no affine model based motion compensation is used in the code later video sequence (CLVS), and inter_affine_flag and cu_affine_type_flag may not be present in coding unit syntax of the CLVS. Otherwise (sps_affine_enabled_flag is equal to 1), affine model based motion compensation can be used in the CLVS.

Continuing to refer to FIG. 1, sps_affine_type_flag in a PPS and/or SPS may specify whether 6-parameter affine model based motion compensation may be used for inter prediction. If sps_affine_type_flag is equal to 0, syntax may be constrained such that no 6-parameter affine model based motion compensation is used in the CLVS, and cu_affine_type_flag may not present in coding unit syntax in the CLVS. Otherwise (sps_affine_type_flag equal to 1), 6-parameter affine model based motion compensation may be used in CLVS. When not present, the value of sps_affine_type_flag may be inferred to be equal to 0.

Accordingly, and still referring to FIG. 1, some implementations of the current subject matter may include utilizing global motion between a current frame and one of a number of references frames. Which reference frame to utilize may be explicitly signaled (e.g., in a PPS). In some implementations, if a reference frame to be utilized is not explicitly signaled, then the reference frame to be utilized may be a frame immediately before current frame. Such an approach may enable more accurate motion representation (e.g., smaller motion vector residual), and smaller pixel residual.

Figure 2:
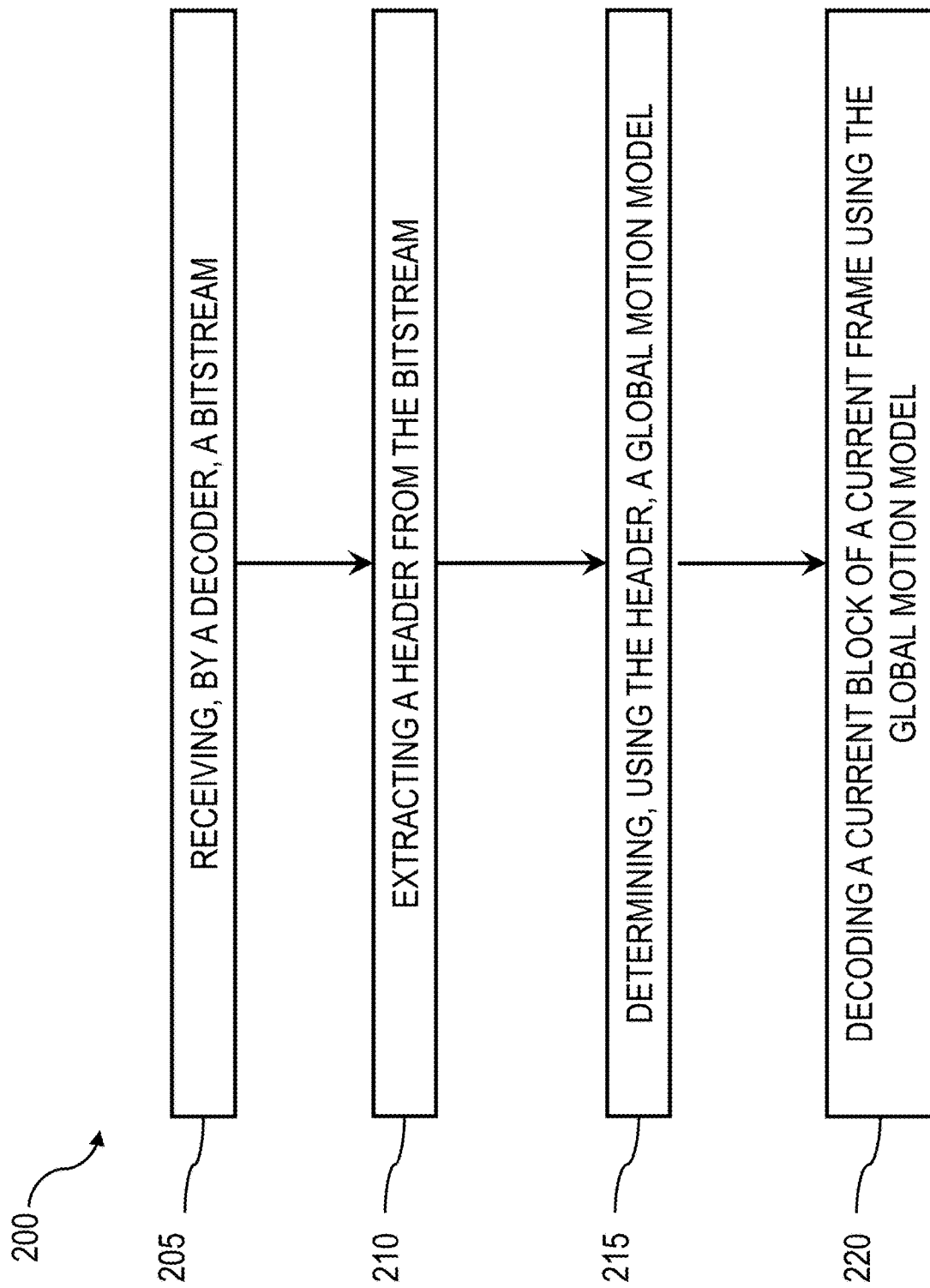
FIG. 2 is a process flow diagram according to some example implementations of the current subject matter.

FIG. 2 is a process flow diagram illustrating an example process 200 of utilizing global motion between a current frame and one of a number of references frames.

At step 205, and still referring to FIG. 2, a bitstream is received by a decoder. A current block may be contained within a bitstream that decoder receives. Bitstream may include, for example, data found in a stream of bits that is an input to a decoder when using data compression. Bitstream may include information necessary to decode a video. Receiving may include extracting and/or parsing a block and associated signaling information from bit stream. In some implementations, a current block may include a coding tree unit (CTU), a coding unit (CU), or a prediction unit (PU).

At step 210, and continuing to refer to FIG. 2, a header may be extracted. Header may include a list of reference frames available for global motion compensation. At step 215, a global motion model for a current block may be determined using the header. Global motion may be relative to a reference frame contained in list of reference frames. At step 220, a current block may be decoded using global motion model.

Figure 3:
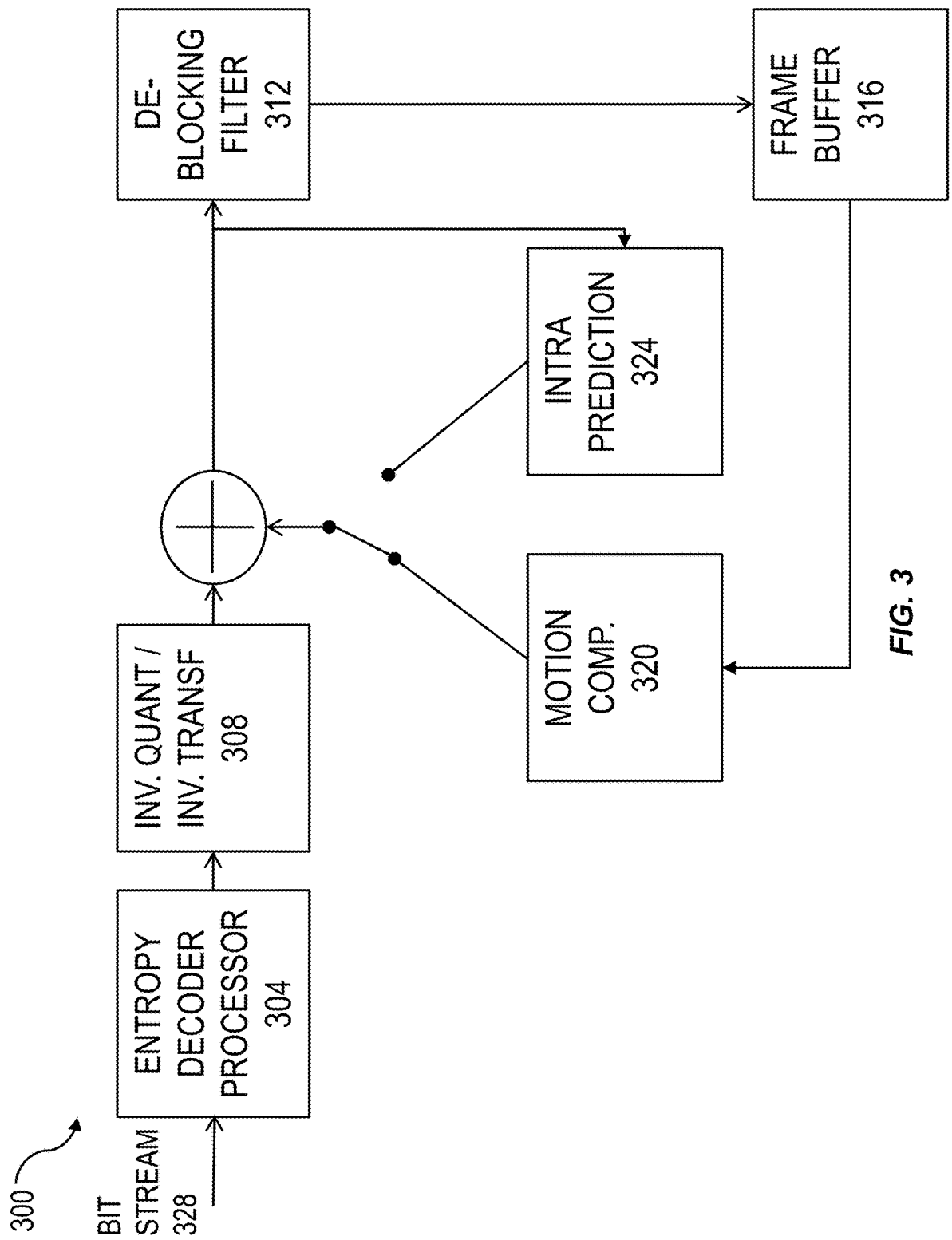
FIG. 3 is a system block diagram of an example decoder according to some example implementations of the current subject matter.

FIG. 3 is a system block diagram illustrating an example decoder 300 capable of decoding a bitstream 328 utilizing global motion between a current frame and one of a number of references frames. Decoder 300 may include an entropy decoder processor 304, an inverse quantization and inverse transformation processor 308, a deblocking filter 312, a frame buffer 316, motion compensation processor 320 and intra prediction processor 324.

In operation, and further referring to FIG. 3, a bit stream 328 may be received by decoder 300 and input to entropy decoder processor 304, which may entropy decode portions of the bit stream into quantized coefficients. Quantized coefficients may be provided to inverse quantization and inverse transformation processor 308, which may perform inverse quantization and inverse transformation to create a residual signal, which may be added to an output of motion compensation processor 320 or intra prediction processor 324 according to processing mode. Output of the motion compensation processor 320 and intra prediction processor 324 may include a block prediction based on a previously decoded block. A sum of prediction and residual may be processed by deblocking filter 630 and stored in a frame buffer 640.

Figure 4:
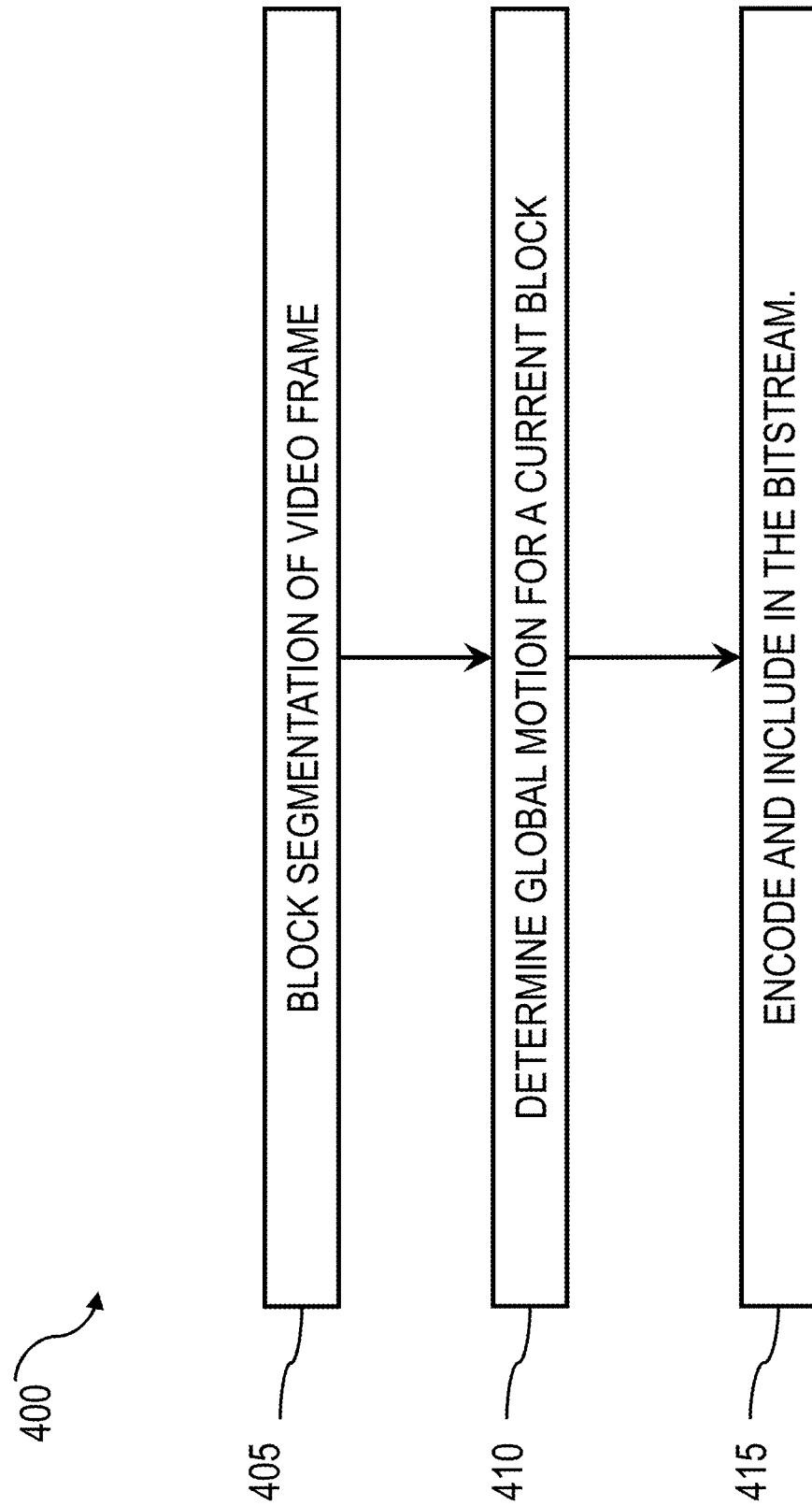
FIG. 4 is a process flow diagram according to some example implementations of the current subject matter.

FIG. 4 is a process flow diagram illustrating an exemplary embodiment of a process 400 of encoding a video with INSERT, according to some aspects of disclosed herein, that may reduce encoding complexity while increasing compression efficiency. At step 405, a video frame may undergo initial block segmentation, which may be accomplished for instance using a tree-structured macro block partitioning scheme that may include partitioning a picture frame into CTUs and CUs. At step 410, global motion for a current block may be determined including determining a reference frame from a number of available reference frames. At step 415, global motion information and block may be encoded and included in a bitstream. Encoded information may include an index to a list of available reference frames. Encoding may include utilizing inter prediction and intra prediction modes, for example.

Figure 5:
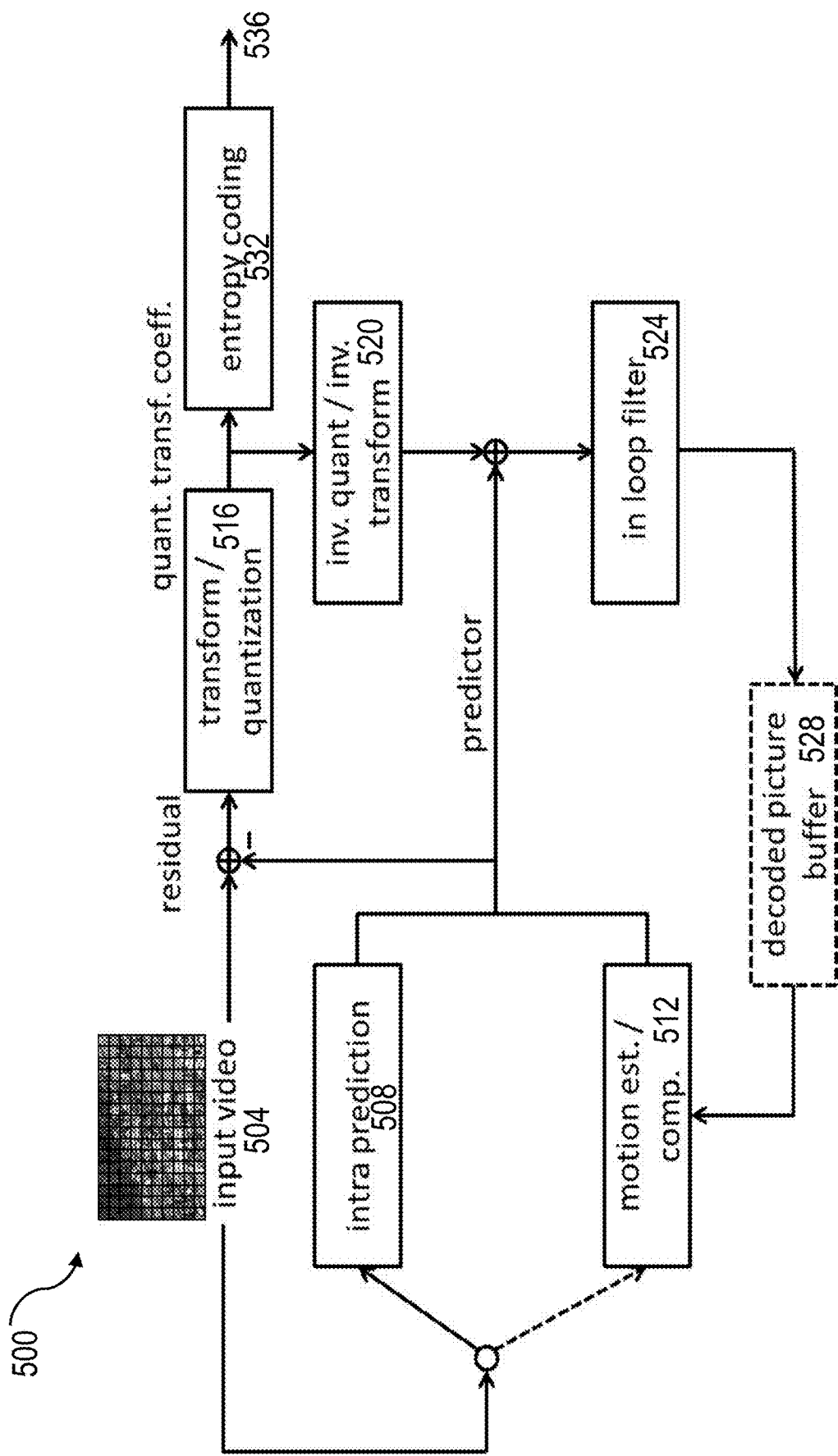
FIG. 5 is a system block diagram of an example encoder according to some example implementations of the current subject matter.

FIG. 5 is a system block diagram illustrating a non-limiting example of a video encoder 500 capable of utilizing global motion between a current frame and one of a number of references frames. Example video encoder 500 may receive an input video 504, which may be initially segmented or dividing according to a processing scheme, such as a tree-structured macro block partitioning scheme (e.g., quad-tree plus binary tree). An example of a tree-structured macro block partitioning scheme may include partitioning a picture frame into large block elements called coding tree units (CTU). In some implementations, each CTU may be further partitioned one or more times into a number of sub-blocks called coding units (CU). A final result of this portioning may include a group of sub-blocks that may be called predictive units (PU). Transform units (TU) may also be utilized.

Still referring to FIG. 5, example video encoder 500 may include an intra prediction processor 508, a motion estimation/compensation processor 512 (also referred to as an inter prediction processor) capable of supporting global motion between a current frame and one of a number of references frames, a transform/quantization processor 516, an inverse quantization/inverse transform processor 520, an in-loop filter 524, a decoded picture buffer 528, and/or an entropy coding processor 532. Bit stream parameters may be input to entropy coding processor 532 for inclusion in an output bit stream 536.

In operation, and continuing to refer to FIG. 5, for each block of a frame of input video 504, whether to process the block via intra picture prediction or using motion estimation/compensation may be determined. Block may be provided to intra prediction processor 508 or motion estimation/compensation processor 512. If block is to be processed via intra prediction, intra prediction processor 508 may perform processing to output a predictor. If block is to be processed via motion estimation/compensation, motion estimation/compensation processor 512 may perform a processing including using global motion between a current frame and one of a number of references frames, if applicable.

Further referring to FIG. 5, a residual can be formed by subtracting predictor from input video. Residual may be received by transform/quantization processor 516, which may perform transformation processing (e.g., discrete cosine transform (DCT)) to produce coefficients, which may be quantized. Quantized coefficients and any associated signaling information may be provided to entropy coding processor 532 for entropy encoding and inclusion in output bit stream 536. Entropy encoding processor 532 may support encoding of signaling information related to encoding current block. In addition, quantized coefficients may be provided to inverse quantization/inverse transformation processor 520, which may reproduce pixels, which may be combined with predictor and processed by in loop filter 524, an output of which may be stored in a decoded picture buffer 528 for use by motion estimation/compensation processor 512 that is capable of utilizing global motion between a current frame and one of a number of references frames.

Still referring to FIG. 5, although a few variations have been described in detail above, other modifications or additions are possible. For example, in some implementations, current blocks may include any symmetric blocks (8×8, 16×16, 32×32, 64×64, 128×128, and the like) as well as any asymmetric block (8×4, 16×8, and the like).

With continued reference to FIG. 5, in some implementations, a quadtree plus binary decision tree (QTBT) may be implemented. In QTBT, at a Coding Tree Unit level, partition parameters of QTBT may be dynamically derived to adapt to local characteristics without transmitting any overhead. Subsequently, at a Coding Unit level, a joint-classifier decision tree structure may eliminate unnecessary iterations and control risk of false prediction. In some implementations, LTR frame block update mode may be available as an additional option available at every leaf node of QTBT.

In some implementations, and with further reference to FIG. 5, additional syntax elements may be signaled at different hierarchy levels of bitstream. For example, a flag may be enabled for an entire sequence by including an enable flag coded in a Sequence Parameter Set (SPS). Further, a CTU flag may be coded at a coding tree unit (CTU) level.

It is to be noted that any one or more of the aspects and embodiments described herein may be conveniently implemented using digital electronic circuitry, integrated circuitry, specially designed application specific integrated circuits (ASICs), field programmable gate arrays (FPGAs) computer hardware, firmware, software, and/or combinations thereof, as realized and/or implemented in one or more machines (e.g., one or more computing devices that are utilized as a user computing device for an electronic document, one or more server devices, such as a document server, etc.) programmed according to the teachings of the present specification, as will be apparent to those of ordinary skill in the computer art. These various aspects or features may include implementation in one or more computer programs and/or software that are executable and/or interpretable on a programmable system including at least one programmable processor, which may be special or general purpose, coupled to receive data and instructions from, and to transmit data and instructions to, a storage system, at least one input device, and at least one output device. Appropriate software coding may readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, Programmable Logic Devices (PLDs), and/or any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
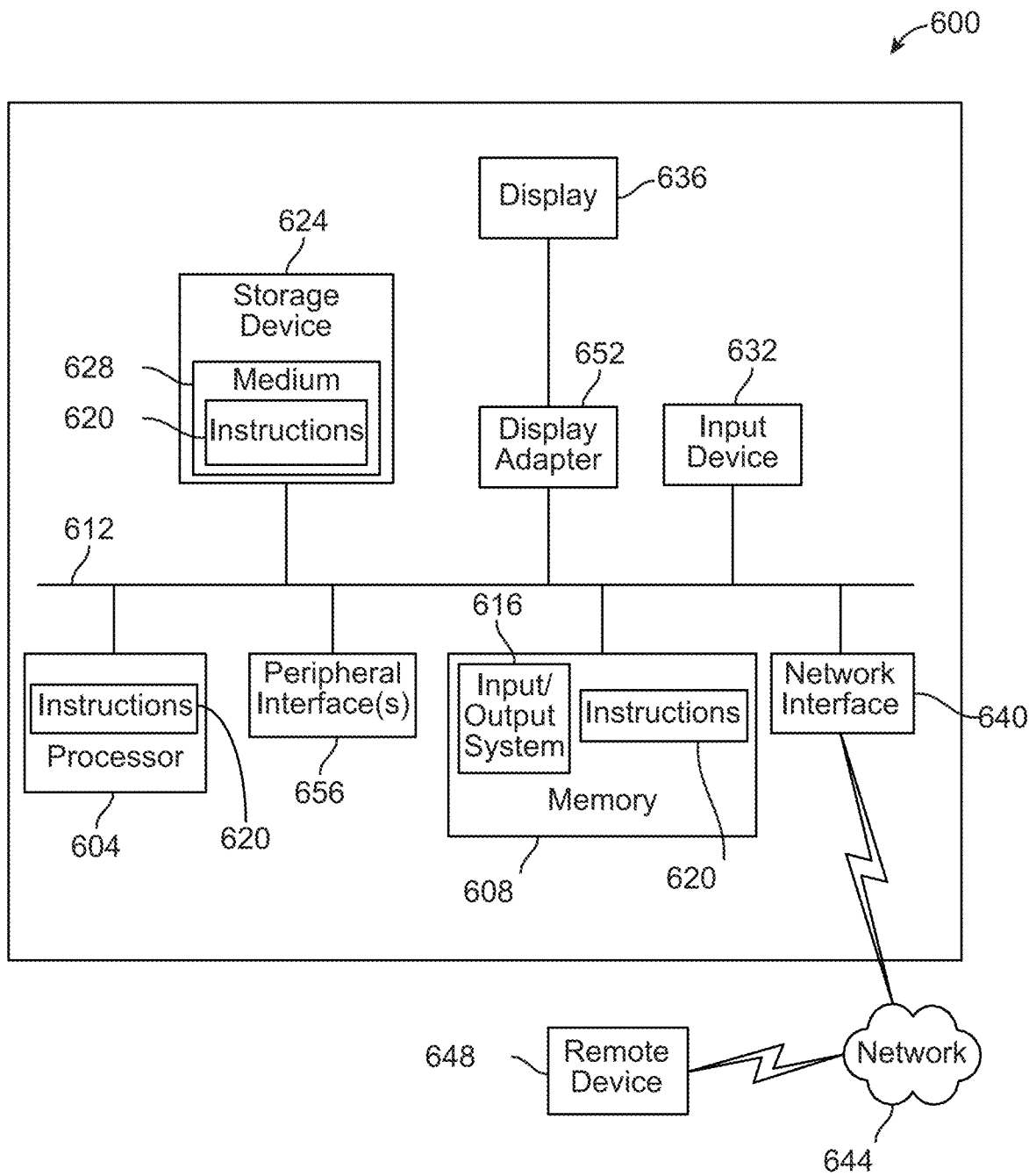
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIREWIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments as disclosed herein. Accordingly, this description is meant to be taken only by way of example, and not to otherwise limit the scope of this invention.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A decoder, the decoder comprising circuitry configured to:
receive a bitstream including a coded current picture, the coded current picture including multiple coding tree units, each coding tree unit including one or more coding units;
construct, using the bitstream, a list of stored previously decoded pictures for use as reference pictures for global motion compensation prediction for the coded current picture, wherein none of the stored reference pictures is obtained by pixel interpolation of a decoded picture using mapping parameters;
for a current coding unit in the current picture, detect from header information in the bitstream for the current coding unit, a flag indicating global motion compensation prediction is enabled for the current coding unit, thereby indicating that each motion vector of the current coding unit is determined relative to a reference picture in the list based on a motion vector of an adjacent coding unit;
if global motion compensation prediction is enabled for the current coding unit, determine based on the header of the current coding unit if a motion model for the current coding unit is translational motion, 4-parameter affine motion or 6-parameter affine motion;
determine at least a motion vector based on an adjacent coding unit, wherein:
if the motion model of the current coding unit is translational motion, determining the at least a motion vector further comprises determining a translational motion vector from the motion vector of an adjacent coding unit, and decode the current coding unit using the translational motion vector;
if the motion model of the current coding unit is 4-parameter affine motion, determining the at least a motion vector further comprises determining two control point motion vectors from the motion vectors of adjacent coding units, and decode the current coding unit using the two control point motion vectors; and
if the motion model of the current coding unit is 6-parameter affine motion, determining the at least a motion vector further comprises determining three control point motion vectors from the motion vectors of adjacent coding units, and decode the coding unit using the three control point motion vectors.

2. The decoder of claim 1, where the reference frames are indexed in the list by an order relative to a current frame.

3. The decoder of claim 1, wherein the header includes a picture parameter set or a sequence parameter set.

4. The decoder of claim 1, wherein the header includes a flag characterizing whether global motion is present for the current block.

5. The decoder of claim 1, wherein the global motion model includes a translational motion model.

6. The decoder of claim 1, wherein the global motion model includes a four parameter affine motion model.

7. The decoder of claim 1, wherein the global motion model includes a six parameter affine motion model.

8. The decoder of claim 1, further comprising:
an entropy decoder processor configured to receive the bit stream and decode the bitstream into quantized coefficients;
an inverse quantization and inverse transformation processor configured to process the quantized coefficients including performing an inverse discrete cosine;
a deblocking filter;
a frame buffer; and
an intra prediction processor.

9. The decoder of claim 1 wherein the current picture contains a plurality of 128×128 coding tree units.

10. The decoder of claim 9 wherein one of the coding tree units has a coding unit with a geometric partition.

11. A method, the method comprising:
receiving, by a decoder, a bitstream including a coded current picture, the coded current picture including multiple coding tree units, each coding tree unit including one or more coding units;
constructing, using the bitstream, a list of stored previously decoded pictures for use as reference pictures for global motion compensation prediction for the coded current picture;
for a current coding unit in the current picture, detecting from header information in the bitstream for the current coding unit, a flag indicating global motion compensation prediction is enabled for the current coding unit, thereby indicating that each motion vector of the current coding unit is determined relative to a reference picture in the list based on a motion vector of an adjacent coding unit;
if global motion compensation prediction is enabled for the current coding unit, determining based on the header of the current coding unit if a motion model for the current coding unit is translational motion, 4-parameter affine motion or 6-parameter affine motion;
determining at least a motion vector based on an adjacent coding unit, wherein:
if the motion model of the current coding unit is translational motion, determining the at least a motion vector further comprises determining a translational motion vector from the motion vector of an adjacent coding unit, and decode the current coding unit using the translational motion vector;
if the motion model of the current coding unit is 4-parameter affine motion, determining the at least a motion vector further comprises determining two control point motion vectors from the motion vectors of adjacent coding units, and decode the current coding unit using the two control point motion vectors; and
if the motion model of the current coding unit is 6-parameter affine motion, determining the at least a motion vector further comprises determining three control point motion vectors from the motion vectors of adjacent coding units, and decode the coding unit using the three control point motion vectors.

12. The method of claim 11, where the reference frames are indexed in the list by an order relative to a current frame.

13. The method of claim 11, wherein the header includes a picture parameter set (PPS) or a sequence parameter set (SPS).

14. The method of claim 11, wherein the header includes a flag characterizing whether global motion is present for the current block.

15. The method of claim 11, wherein the global motion model includes a translational motion model.

16. The method of claim 11, wherein the global motion model includes a four parameter affine motion model.

17. The method of claim 11, wherein the global motion model includes a six parameter affine motion model.

18. The method of claim 11, the decoder further comprising:
- an entropy decoder processor configured to receive the bit stream and decode the bitstream into quantized coefficients;
- an inverse quantization and inverse transformation processor configured to process the quantized coefficients including performing an inverse discrete cosine;
- a deblocking filter;
- a frame buffer; and
- an intra prediction processor.

19. The method of claim 11 wherein the current picture contains a plurality of 128×128 coding tree units.

20. The method of claim 19 wherein one of the coding tree units has a coding unit with a geometric partition.

* * * * *